United States Patent Office 2,770,611
Patented Nov. 13, 1956

2,770,611

HALOGENATED POLYMERS STABILIZED WITH A HEXAORGANODISTANNOXANE

Siegfried Nitzsche and Rudolf Riedle, Burghausen, Germany, assignors to Wacker Chemie G. m. b. H., Munich, Germany No Drawing. Application March 9, 1954,
Serial No. 415,148

Claims priority, application Germany March 14, 1953

3 Claims. (Cl. 260—45.75)

The present invention relates to stabilized halogenated polymers and to methods for achieving such stabilization.

The stabilization of halogen-containing polymers, e. g., polyvinylchloride, polyvinylidenechloride, various copolymers thereof, etc., has been a continuing problem for years in the general field of organic polymers and plastics. Under the action of heat and/or light, such polymers become discolored and also decrease in mechanical strength.

For the prevention of these undesirable phenomena, many stabilizers have already been proposed, e. g., alkali and alkaline earth salts, nitrogenous compounds, epoxides, unsaturated organic acids, and various tin and lead compounds. Up to the present time, the best stabilizers have proved to be the organotin compounds, especially the dialkyl tin salts. The best of such stabilizers have left much to be desired, however. Usually they must be incorporated in the polymers to be stabilized in comparatively large amounts, for example at about 3 percent by weight, and thereby often cause cloudiness of the polymer. The dialkyl tin salts have the disadvantage that they are eventually converted to white insoluble dialkyl tin oxide.

Tributyl tin hydroxide has also been suggested as a stabilization agent. In order to provide satisfactory results, this agent is ordinarily used in conjunction with various lead compounds. The addition of lead, however, again causes a disadvantage in that the products do not remain clear.

It is an object of the present invention to provide new and improved compositions of halogen-containing polymers having enhanced stability toward the action of heat and light and which do not have the inherent disadvantages of the stabilized polymers of the past.

In accordance with the present invention a hexaorganodistannoxane is incorporated into the halogenated polymer in order to produce a composition of enhanced stability.

Hexaorganodistannoxanes can be prepared by heating, under rather severe conditions, the corresponding triorganotin hydroxide. Preferably, this reaction is carried out in the presence of a dehydrating agent. The hexaorganodistannoxanes are generally liquid materials which possess an extraordinarily low vapor pressure, both of which factors make them very desirable as stabilization agents. They are soluble in or compatible with the halogenated polymers, and they do not form polymerization products which will cause cloudiness in the composition.

The hexaorganodistannoxanes have the general formula $R_3SnOSnR_3$ where each R represents the same or different organic radicals. Preferably, R is an aliphatic, alicyclic or aromatic hydrocarbon radical, or a heterocyclic radical. Examples of suitable aliphatic radicals are methyl, ethyl, propyl, isopropyl, butyl, isobutyl, t-butyl, amyl, isoamyl, t-amyl, hexyl, heptyl, octyl, dodecyl, 2-ethylbutyl, 2-ethylhexyl, etc.; suitable aryl radicals are, e. g., phenyl, tolyl, xylyl, and naphthyl. Cyclohexyl is illustrative of the suitable alicyclic radicals, and thienyl is illustrative of the heterocyclic radicals. The preferred compounds are those in which R is an aliphatic radical of from 2 to 6 carbon atoms inclusive. The very best results seem to be obtained from compounds in which R is butyl, isobutyl, or t-butyl. The hexaorganodistannoxanes are known and described in the literature.

Halogen-containing polymers, which can be protected against discoloration and decomposition by the stabilizers of the invention, are, e. g., polyvinyl chloride; copolymers of vinyl chloride with organic vinyl esters, e. g., vinyl acetate, with acrylic acid or methacrylic acid, esters of acrylic or methacrylic acid and acrylonitrile; copolymers of vinyl chloride with unsaturated dicarboxylic acids, their anhydrides or esters; after-chlorinated polymers of polyvinyl chloride or of copolymers of polyvinyl chloride; copolymers of vinyl chloride with vinylidene chloride; copolymers of vinyl chloride with diene compounds; polyvinyl acetals; chlorinated rubber; polymers and copolymers of 2-chlorobutadiene; polymers of halogen-containing organosilicon compounds (such as chlorophenyl- or bromophenylsiloxanes) as well as polymers of organosilicon compounds which contain traces of halogen due to their preparation from halogen-containing monomers, silicone oils, silicone resins and silicone rubber; halogen-containing polymers of hydrocarbons, e. g., chloroparaffins, etc.

The amount of hexaorganodistannoxanes employed in this invention can vary over an extremely wide range. Good stabilization is obtained at concentrations as low as 0.1 percent by weight, with beneficial results decreasing gradually below such a concentration. Ordinarily there is no particular benefit in using more than 3 percent by weight of the stabilization agents, although the upper limit is determined only by the compatibility of the particular agent employed. In general the most preferred concentration of stabilizer is in the neighborhood of 0.5 percent by weight. This is, of course, only a generalization, for the best amount will depend upon the stability of the polymer to be stabilized and upon the particular uses in which the polymer will be employed.

The following examples are illustrative only. All parts described are parts by weight.

Example 1

Hexabutyldistannoxane was prepared by heating 50 parts of tributyltin chloride with 150 parts of 20 percent aqueous sodium hydroxide in the presence of ethanol. The ethanol was distilled off and the resulting cloudy oil was separated and heated at 200 to 220° C. to distill off the water of condensation. Pure hexabutyldistannoxane was obtained as a yellowish oil distilling at 200° C. at a pressure of 4 mm. mercury.

0.5 part of this oil was mixed with 100 parts polyvinyl chloride and 35 parts dioctylphthalate on mixing rolls which were heated at 160° C. No discoloration or cloudiness in the rolled product was observed even after 60 minutes of rolling at the elevated temperature. When 2 or more parts of this stabilizer were employed, it was found that rolling could be continued for hours at 160° C. with no noticeable clouding of the polymer.

When hexaphenyldistannoxane, hexacyclohexyldistannoxane, hexathienyldistannoxane, or trimethylthriethyldistannoxane were employed as stabilizers in the above-described manner, discoloration and cloudiness in the rolled product was prevented for similar extended periods of time.

Example 2

2 parts of hexabutyldistannoxane were intimately ground with 100 parts of polyvinylidene chloride. This mixture was heated in a hydraulic press for 5 minutes at 160° C. A slightly orange-colored molded product was obtained. If pure, unstabilized polyvinylidene chloride is heated under the same conditions, a chocolate-brown to black molded product is obtained.

Example 3

100 parts of a copolymer consisting of 87 parts of vinylchloride and 13 parts of vinyl acetate with a chlorine content of 48.7 percent were placed, together with 1 part of hexabutyldistannoxane, on a rolling mill whose rolls were kept at a temperature of 160° C. A slightly yellowish rolled sheet was obtained which on further rolling after 50 minutes became orange and after 60 minutes rather quickly turned black and brittle. An attempt to roll the same copolymer without stabilizer at 160° C. showed that it is impossible to get a clear rolled sheet. After 8 minutes, even before the mass was plasticized to a homogeneous state, the rolled sheet turned black, wrinkled and tacky.

Hexabutyldistannoxane was found to have a similar stabilizing effect upon chlorinated rubber, polymers and copolymers of 2-chlorobutadiene and copolymers of vinylchloride with acrylic acid or methacrylic acid and esters thereof.

Example 4

Triethyltin chloride was saponified with an alcoholic lye as described in Example 1. Upon distillation a water-white oil boiling at 146 to 147° C at 12 mm. Hg ($n_D^{20}$=1.4975) was obtained, which is the pure hexaethyldistannoxane.

1 part of this oil was rolled with 100 parts of polyvinyl chloride and 35 parts of dioctyl phthalate on a rolling mill at 160° C. A clear, colorless rolled sheet was obtained which did not show any discoloration or cloudiness even after 120 minutes of further rolling at 160° C. In addition, the mechanical properties of the sheet were not impaired.

That which is claimed is:

1. A composition consisting essentially of a chlorohydrocarbon high polymer and from 0.1 to 3 percent by weight based on the weight of the polymer of a distannoxane of the formula $R_3SnOSnR_3$, where R is a hydrocarbon radical selected from the group consisting of aliphatic, alicyclic, and aromatic radicals.

2. A composition in accordance with claim 1 wherein R is a butyl radical.

3. A composition consisting essentially of a chlorohydrocarbon high polymer selected from the group consisting of polymers and copolymers of vinylchloride and vinylidene chloride and from 0.1 to 3 percent by weight based on the weight of the polymer of a compound of the formula $R_3SnOSnR_3$ where R is a hydrocarbon radical selected from the group consisting of aliphatic, alicyclic, and aromatic radicals.

References Cited in the file of this patent
UNITED STATES PATENTS

| | | |
|---|---|---|
| 2,592,926 | Mack et al. | Apr. 15, 1952 |
| 2,626,953 | Mack et al. | Jan. 27, 1953 |